Patented June 16, 1936

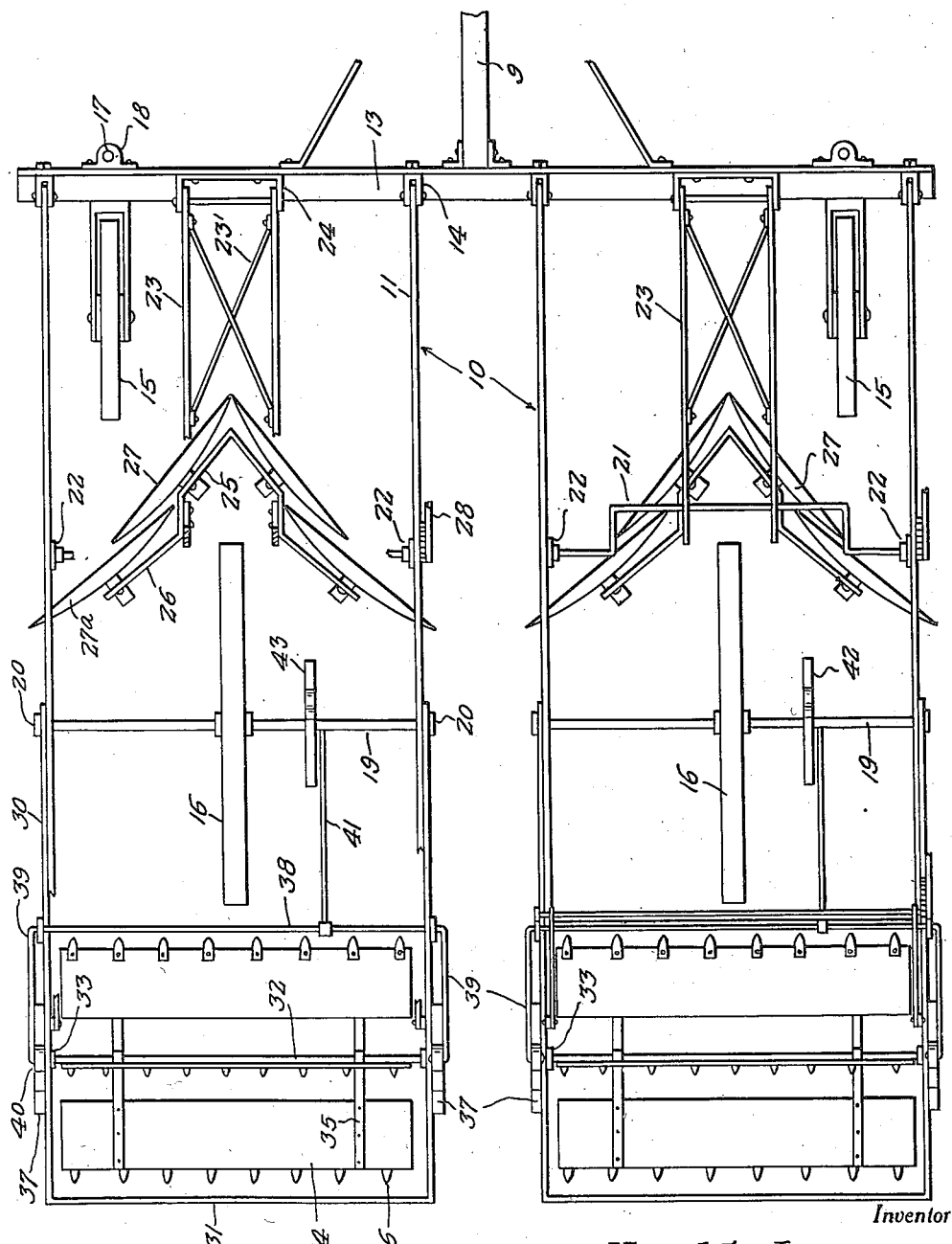

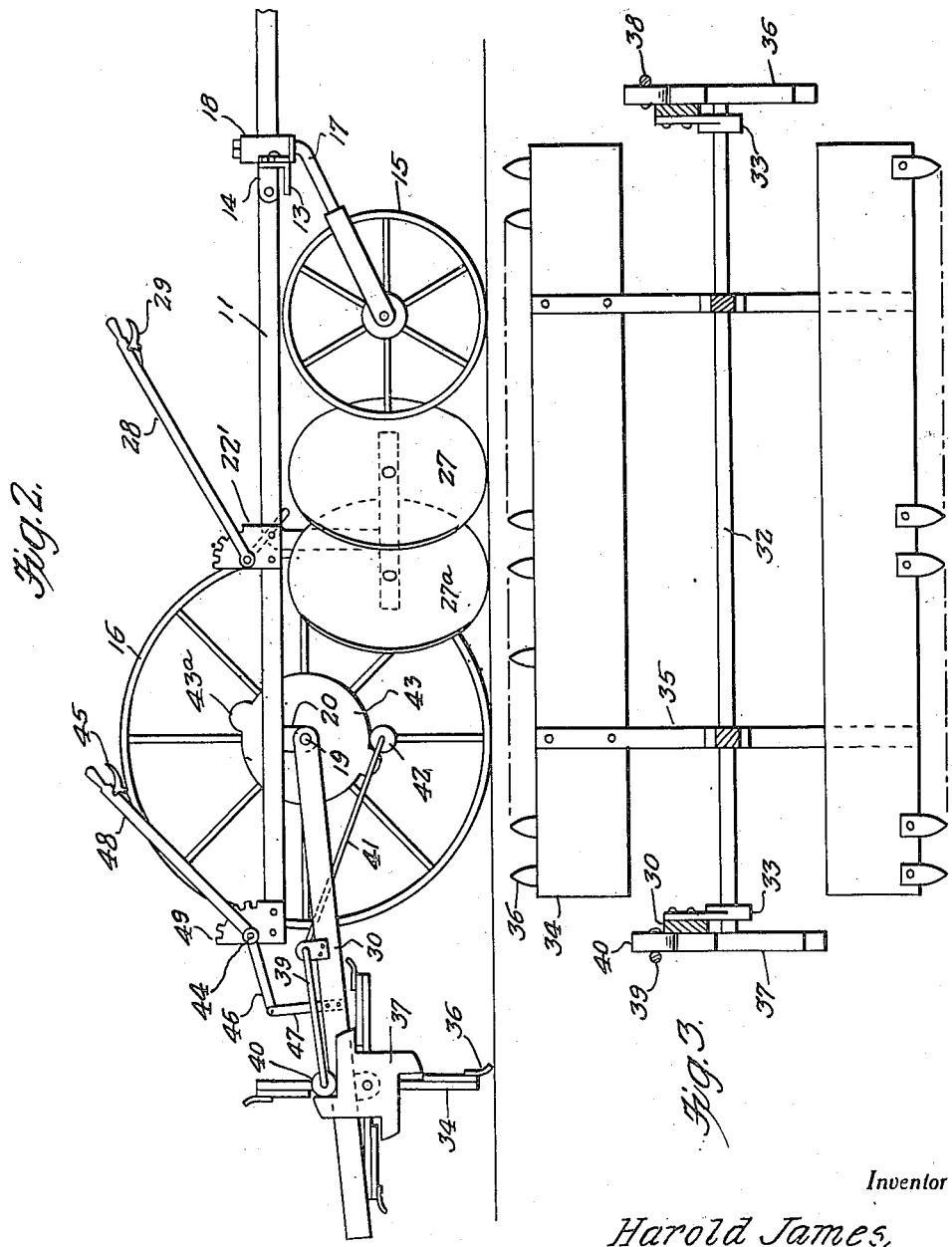

2,044,304

UNITED STATES PATENT OFFICE 2,044,304

LAND BLOCKING MACHINE

Harold James, Booker, Tex.

Application September 9, 1935, Serial No. 39,817

1 Claim. (Cl. 97—55)

This invention relates to land blocking machines, the object of the invention being to provide a machine of this character for working the soil into a plurality of individual squares bordered by a ridge of dirt to retain water in the squares.

Among the objects of the invention is to provide a machine of this character wherein the longitudinal ridges and the transverse ridges are formed in substantially one operation.

A further object of the invention is to provide in a machine of this character earth working implements which may be readily adjusted vertically for regulating the cutting depths thereof.

A still further object of the invention is to provide in a machine of this character earth working mechanisms operable independently of each other.

The invention, together with its objects and advantages, will be best understood from a study of the following description taken in connection with the accompanying drawings, wherein—

Figure 1 is a top plan view of a machine embodying the features of the present invention.

Figure 2 is a side elevational view thereof.

Figure 3 is a detailed view showing more clearly a rotary scraper blade assembly, certain parts being shown in section, and other parts in elevation.

Referring to the drawings more in detail, it will be seen that in the preferred embodiment thereof the machine includes a main cross bar 13 to which is secured in any suitable manner a draft tongue 9.

Further, the invention comprehends the provision of one or more earth working assemblies indicated generally by the reference numeral 10. In the present invention, there are shown two of such assemblies.

Since the assemblies are identical, it is thought that a detailed description of one will suffice.

Thus it will be seen that the assembly 10 comprises a pair of side bars 11 pivoted at one end to brackets 14 suitably secured in laterally spaced relation on the main bar 13. Inwardly from the outermost side bar 11, the main frame bar 13 is supported by a swivelly mounted wheel 15. The fork of the swivel wheel 15 has an angularly disposed free end suitably journalled in a bearing 18 secured to the frame bar 13.

The side bars 11 are provided with depending bearings 20 in which are journalled the ends of a transverse shaft 19. Mounted on the shaft 19 in the assembly 10 is a large traction wheel 16 supporting the rear portion of the frame bars 11.

Rotatably supported between the side bars 11, and through the medium of bearing brackets 22, is a crank 21 equipped at one end with a hand lever 28 that in turn is equipped with a suitable detent structure 29 for securing the shaft 21 at the desired adjustment. The "throw" of the crank 21 supports the free end of spaced parallel beams 23 which at one end are pivotally connected with a bracket 24 suitably mounted on the bar 13. The beams 23 are secured in spaced relation, and braced relative to one another through the medium of crossed braces 23'.

At their free ends the beams 23 have downwardly extending terminal portions which are secured to parallel straight portions of the sides of a substantially V-shaped lister supporting member 25.

Suitably and rotatably mounted on the diverging sides of the V-shaped member are lister disks 27.

In connection with the above, it will be noted that the sides of the V-shaped member 25 have intermediate parallel portions, as above referred to, and outwardly extending end portions 26. On the end portions 26 of the supporting member 25 are suitably and rotatably mounted lister disks 27a. It will also be seen that by rocking the crank 21, beams 23 will be caused to swing about a common pivot for raising or lowering disks 27, 27a, for controlling the cutting depth of the lister.

In this connection it may be stated that disks 27, 27a, are provided for forming parallel longitudinal ridges in the land blocking operation.

Arms 30 at one end are loosely engaged with the shaft 19 for swinging movement relative to the shaft 19 as a pivot. The arms 30 form the sides of a substantially U-shaped frame, the closed end of which is indicated by the reference numeral 31.

Journalled in this frame between the sides 30 thereof, is a shaft 32 on which is mounted a bladed wheel. This wheel consists of a pair of hubs 33 and spaced from one another on the shaft 32.

Projecting from the hubs are arms 35 to the ends of which are secured scraper blades 34. On their free or working edges, blades 34 are provided with spaced harrow teeth 36 (see Fig. 3). For controlling rotative movement of the blade equipped wheel, there are provided on the respective opposite ends of the shaft 32 notched disks or plates 37. Riding on the peripheries of the plates 27 are rollers 40 suitably journalled on the sides 39 of a substantially U-shaped member 38 suitably journalled at the closed end of the U in bearings provided on the arms 30, as best shown in Figures 1 and 2.

Extending from the closed end of the member 38 is a rigid arm 40 that is equipped at its free end with a roller or cam follower 42 engaging the periphery of a cam wheel or disk 43 secured to the shaft 19 for rotation with the shaft. As best shown in Figure 2, the cam disk 42 is provided on its periphery with diametrically disposed cam humps 43a successively engageable with the cam follower 42 for tripping the member 38 at each half revolution of the cam disk whereby the bladed wheel is periodically freed to rotate freely for a predetermined portion of a revolution, as and for the purpose hereinafter made manifest.

For swinging the arms 30 either vertically, upwardly or downwardly to control the digging depth of the blades 34, there is provided a suitable mechanism consisting of a shaft 44 suitably journalled in brackets provided therefor at the free ends of the sides 11. The shaft 44 is operatively connected with one of the side members 30 through the medium of an arm 46 provided on the shaft 44 and pivotally connected with the rod 47 fixedly secured to one of the side members 30 as shown in Figure 2. On one end of the shaft 44 is a hand lever 48 equipped with a suitable hand operated pawl 45 cooperable with a rack segment 49 for securing the shaft 44 at the desired adjustment.

The operation of this machine may briefly be described as follows:—

As the machine travels over the ground, the lister disks 27, 27a, throw up the dirt in longitudinal ridges while the depending scraper blade 34 serves to scrape the dirt between the ridges in a manner to form transverse ridges. At predetermined intervals through the medium of the cam disk 43 and cam follower 42, the member 38 is tipped for releasing the plate 37 causing the bladed wheel to rotate. In this manner, at predetermined intervals, transverse ridges are formed by the bladed wheel, and these ridges, together with the longitudinal ridges, provide uniform squares or soil blocks each surrounded on all sides by an upstanding ridge or wall of earth, thus providing each square with a moisture retaining wall. As the result, the ground over which the machine has travelled, will be provided with a plurality of uniform squares of soil, suitably blocked for retaining moisture.

Having thus described the invention, what is claimed as new is:—

A soil blocking machine comprising a wheeled structure including an axle, a frame pivotally mounted on the structure, a pair of lister disks supported by the said structure for forming parallel ridges, a rotary structure including a plurality of radially disposed blades, said rotary structure being mounted in the pivotal frame, a ratchet on the rotary structure, a cam on the axle, a rocker mounted on the pivotal frame, one end of the rocker being engageable with the cam and the other end engageable with the ratchet.

HAROLD JAMES.